US009396859B2

(12) United States Patent  
Jobert et al.

(10) Patent No.: US 9,396,859 B2
(45) Date of Patent: Jul. 19, 2016

(54) MAGNETIC RING REMOVABLY ATTACHABLE TO A PENCIL OR ERASER

(71) Applicant: Commissariat à l'énergie atomique et aux énergies alternatives, Paris (FR)

(72) Inventors: Timothée Jobert, Grenoble (FR); Tristan Hautson, Fontaine (FR); Jean-Luc Vallejo, Grenoble (FR)

(73) Assignee: Commissariat a l'energie atomique et aux engergies alternatives, Paris (FR)

( * ) Notice: Subject to any disclaimer, the term of this patent is extended or adjusted under 35 U.S.C. 154(b) by 0 days.

(21) Appl. No.: 14/433,767

(22) PCT Filed: Oct. 2, 2013

(86) PCT No.: PCT/EP2013/070504
§ 371 (c)(1),
(2) Date: Apr. 6, 2015

(87) PCT Pub. No.: WO2014/053526
PCT Pub. Date: Apr. 10, 2014

(65) Prior Publication Data
US 2015/0279537 A1    Oct. 1, 2015

(30) Foreign Application Priority Data

Oct. 5, 2012 (FR) ...................... 12 59525

(51) Int. Cl.
*H01F 7/02* (2006.01)
*B43K 29/00* (2006.01)
(Continued)

(52) U.S. Cl.
CPC ............ *H01F 7/0273* (2013.01); *B43K 29/00* (2013.01); *B43K 29/08* (2013.01); *B43L 3/00* (2013.01);
(Continued)

(58) Field of Classification Search
CPC ........ B43K 29/00; B43K 29/08; G06F 3/039; G06F 3/046; G06F 3/03545; H01F 7/0273; B43L 3/00; B43L 5/005; B43L 19/0062; B43L 19/0068
See application file for complete search history.

(56) References Cited

U.S. PATENT DOCUMENTS 4,670,751 A * 6/1987 Enokido ................. G06F 3/038
178/19.01
2005/0062730 A1* 3/2005 Birecki ............... G06F 3/03545
345/179
(Continued)

FOREIGN PATENT DOCUMENTS

EP    0159498    10/1985
FR    1252880    3/1961
(Continued)

*Primary Examiner* — Mohamad Musleh
(74) *Attorney, Agent, or Firm* — Occhiuti & Rohlicek LLP

(57) ABSTRACT

A magnetic ring fixed removably onto a pencil/eraser, with a smaller internal diameter being between 1.5 mm and 3 cm. There is a cylindrical inner face centered on a longitudinal axis and an outer face opposite the inner face. There is a magnetic material distributed in a magnetic layer around the longitudinal axis with the direction of the overall magnetic moment of the magnetic ring parallel to the longitudinal axis. There is an elastic material, distinct from the magnetic material, that is elastically deformable between a rest position corresponding to a first value of the internal diameter of the ring, and a deformed position corresponding to a second value of the internal diameter of the ring. The difference between the first and second values being greater than or equal to 1 mm and the elastic material exhibiting a Young's modulus at 25° C. less than or equal to 1 GPa.

10 Claims, 4 Drawing Sheets

(51) Int. Cl.
  *G06F 3/039* (2013.01)
  *G06F 3/046* (2006.01)
  *G06F 3/0354* (2013.01)
  *B43K 29/08* (2006.01)
  *B43L 3/00* (2006.01)
  *B43L 5/00* (2006.01)
  *B43L 19/00* (2006.01)

(52) U.S. Cl.
  CPC .............. *B43L 5/005* (2013.01); *B43L 19/0062* (2013.01); *B43L 19/0068* (2013.01); *G06F 3/039* (2013.01); *G06F 3/03545* (2013.01); *G06F 3/046* (2013.01)

(56) References Cited

U.S. PATENT DOCUMENTS

2008/0210724 A1* 9/2008 Geis ................... G06F 3/03545
                                                        224/217
2011/0086335 A1 4/2011 Rogers

FOREIGN PATENT DOCUMENTS

| FR | 1252881 | 3/1961 |
| FR | 2586302 | 2/1987 |
| FR | 2952450 | 5/2011 |
| WO | 2005024620 | 3/2005 |
| WO | 2008070147 | 6/2008 |

* cited by examiner

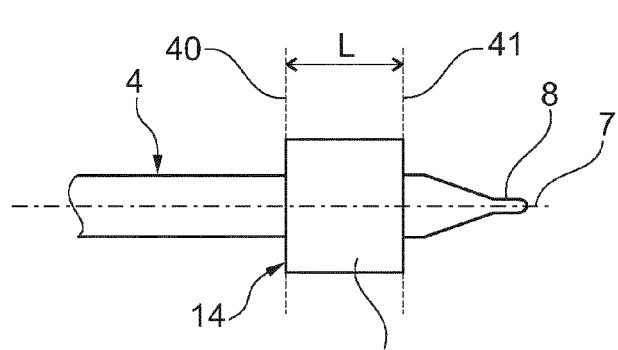
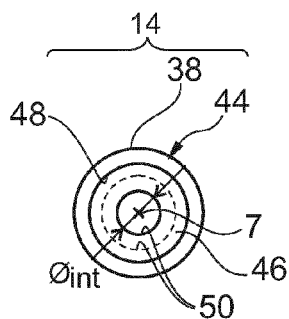
Fig. 3  Fig. 4
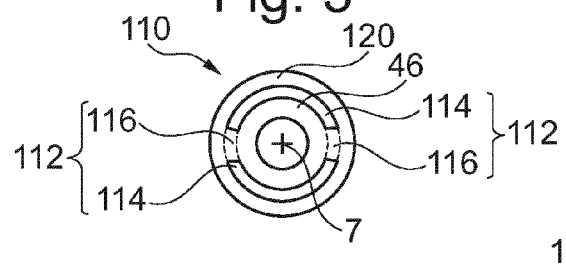
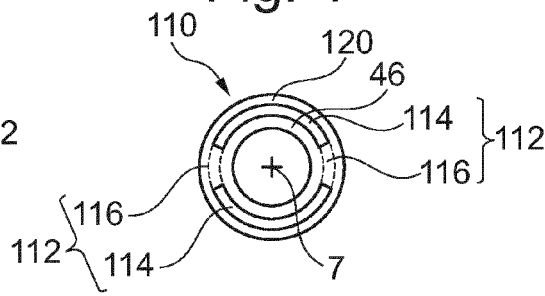
Fig. 6  Fig. 7
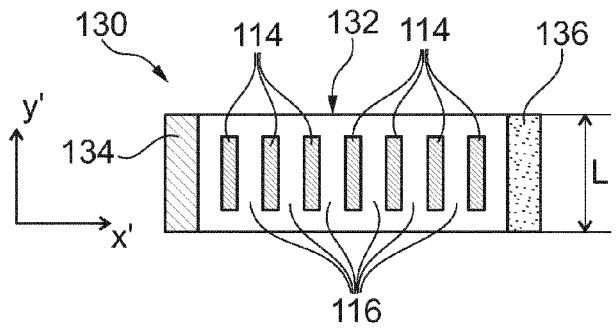
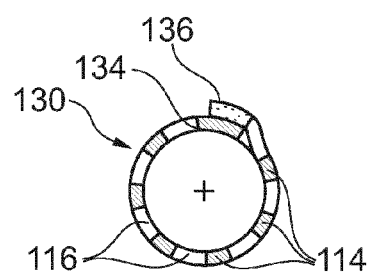
Fig. 8  Fig. 9
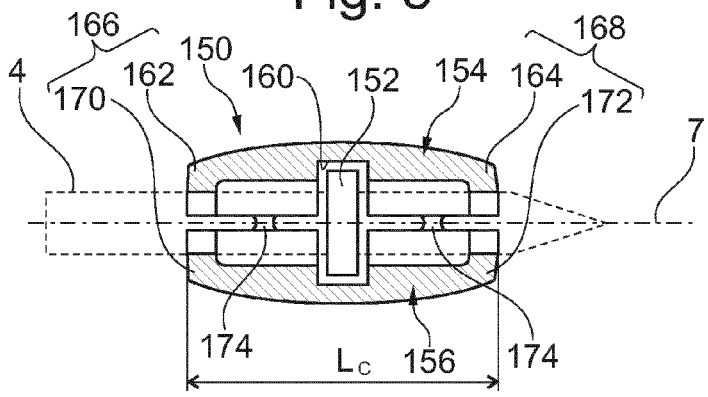
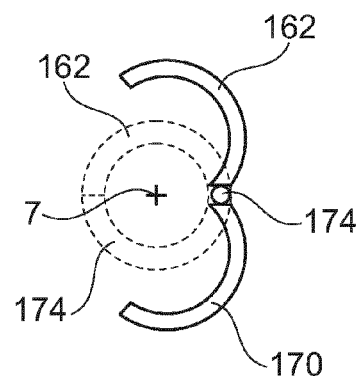
Fig. 10  Fig. 11

MAGNETIC RING REMOVABLY ATTACHABLE TO A PENCIL OR ERASER

RELATED APPLICATIONS

This application is a U.S. National Stage of international application number PCT/EP2013/070504 filed Oct. 2, 2013, which claims the benefit of the priority date of French Patent Application FR 12/59525, filed Oct. 5, 2012, the contents of which are herein incorporated by reference.

FIELD OF INVENTION

The invention relates to a magnetic ring suitable for being fixed removably onto a pencil or an eraser and an accessory for such a pencil. Another subject of the invention is a system for plotting the trace of a pencil or of an eraser, equipped with this magnetic ring.

BACKGROUND

The inventors are familiar with systems for plotting the trace of a pencil or of an eraser on a writing medium comprising:

a magnetic ring suitable for being fixed removably onto the pencil or the eraser, a network of magnetometers suitable for measuring the magnetic field generated by the magnetic ring, this network of magnetometers being fixed with no degree of freedom to a bearing face of a tablet, this bearing face forming the writing medium or supporting the writing medium, a computer suitable for determining the position and the orientation of the magnetic ring in order to deduce therefrom the position of the tip or point of the pencil or of the eraser relative to the bearing face from the measurements of the network of magnetometers.

Such a system is described in the patent applications filed under the numbers FR1252881 and FR1252880 on 29 Mar. 2012.

This system presents the notable advantage, compared to other known systems, that the pencil or the eraser only needs to be equipped with a magnet to be able to work.

The term "pencil" is used here to describe any utensil that can be directly manipulated by the hand of a human being in order to draw a trace on a physical writing medium, such as, for example, a pen or a brush. Typically, the trace is visible to the naked eye either directly on the physical medium or on a display screen. To leave a directly visible trace on the medium, the pencil deposits a colored liquid or solid to form the trace that is directly visible to a human being on the writing medium. The colored liquid is typically an ink or paint. The colored solid is, for example, graphite.

The term "eraser" is used here to describe any utensil that can be directly manipulated by the hand of a human being in order to draw a trace on a physical writing medium which, when it encounters the trace left by the pencil, erases the trace left by this pencil. The erasure can be a digital erasure of data of a trace recorded using a pencil or be a physical erasure of the trace on the medium. For example, the physical erasure of the trace on the medium can be caused by a chemical reaction and/or a mechanical effect such as abrasion. Unlike the pencil, the trace drawn by the eraser is not generally visible to the naked eye.

The term "draw" is used here to encompass the act of running a point over the writing medium in order to write or erase.

The writing medium is a sheet of paper, a canvas or any other medium on which it is possible to draw.

To obtain a good accuracy in the plotting of the trace of the pencil or of the eraser, the latter must be equipped with a magnetic ring exhibiting a powerful magnetic field. This dictates the use of particular magnetic materials which exhibit, generally, a very high hardness. Thus, the magnetic rings produced with such a magnetic material have a predefined internal diameter which cannot be adapted to different pencils or erasers that have different external diameters. This therefore dictates the production of specific pencils or erasers that have an external diameter corresponding to the internal diameter of the magnetic ring.

However, it is desirable to enable the user to use the trace plotting system with his or her usual pencils or erasers. These usual pencils or erasers exhibit a wide diversity of forms and notably of external diameters of the body of the pencil or of the eraser. This diversity of external diameters is incompatible with the rigidity of the magnetic magnet which has to be used in the plotting system. Thus, the current plotting systems do not make it possible to use pencils or erasers of different external diameters.

Prior art is also known from: EP0159498 A1, WO2008/070147A1, US2011/086335A1, WO2005/024620A1, FR2586302A1 and FR2952450A1.

SUMMARY

The invention aims to remedy this drawback. Therefore, its subject is a magnetic ring according to claim 1.

In the above magnetic ring, the presence of the elastic material in the ring makes it possible to adapt the same ring to different external diameters of pencils or of erasers while allowing the use of a very rigid magnetic material.

The embodiments of this ring can comprise one or more of the features of the dependent claims.

These embodiments of the magnetic ring also offer the following advantages:

the presence of the elastic material between the magnetic layer and the inner face of the ring or between different separate magnetic blocks makes it possible to simply produce a magnetic ring whose internal diameter can be adapted to different external pencil diameters;

the use of a ring whose length is at least greater than its internal diameter makes it possible to obtain a good parallel alignment between the longitudinal axis of the pencil and that of the ring.

Another subject of the invention is an accessory for a pencil or an eraser according to claim 9.

The above accessory makes it possible to use a magnetic ring whose length is less than its internal diameter while guaranteeing a good parallel alignment between the longitudinal axes of this ring and of the pencil on which it has to be fitted.

Finally, another subject of the invention is a system for plotting the trace of a pencil or of an eraser on a writing medium according to claim 10.

The invention will be better understood on reading the following description, given purely as a non-limiting example and with reference to the drawings.

BRIEF DESCRIPTION OF THE DRAWINGS

FIG. 3 is a schematic illustration, in side view, of a first embodiment of a magnetic ring used in the system of FIG. 1;

FIG. 4 is a schematic illustration, in transverse cross section, of the ring of FIG. 3;

FIGS. 6 and 7 are schematic illustrations of a second embodiment of a magnetic ring that can be used in the system of FIG. 1;

FIGS. 8 and 9 are schematic illustrations of a third embodiment of a magnetic ring that can be used in the system of FIG. 1;

FIG. 10 is a schematic illustration in longitudinal cross section of an accessory for a pencil that can be used in the system of FIG. 1;

FIG. 11 is a schematic illustration, in side view, of a jaw of the accessory of FIG. 10;

DETAILED DESCRIPTION

In these figures, the same references are used to denote the same elements.

Hereinafter in this description, the features and functions that are well known to those skilled in the art are not described in detail.

Figure 1:
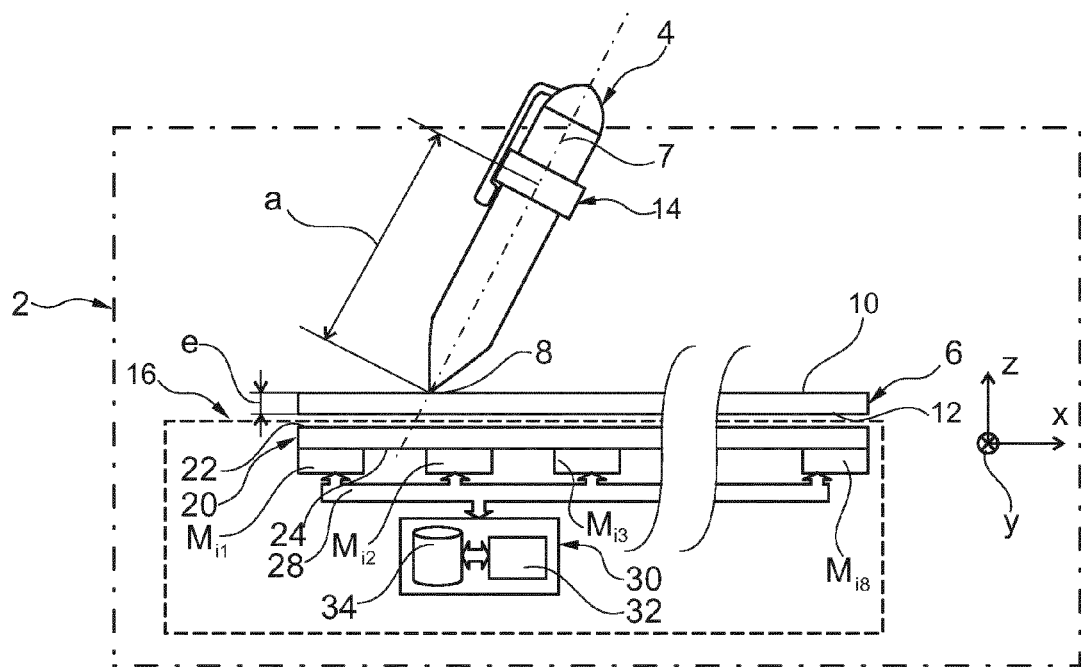
FIG. 1 is a schematic illustration of a system for plotting the trace of a pencil.

FIG. 1 represents a system 2 for plotting the trace of the tip or point of a pencil 4 on a writing medium 6.

The pencil 4 can be freely displaced directly by the hand of a human being within an XYZ reference frame that is fixed with no degree of freedom to the system 2. Here, the directions X and Y of this reference frame are horizontal and the direction Z is vertical. Hereinafter, the terms "above", "below", "top", "bottom" are relative to this vertical direction Z.

The pencil 4 typically weighs less than 1 kg and, preferably, less than 200 g or 100 g. The dimensions of this pencil are also small enough for it to be held using a single hand by a human being. The pencil 4 has an oblong form. It extends along a longitudinal axis 7.

For example, this pencil 4 is entirely produced from non-magnetic materials, that is to say materials that do not exhibit any magnetic property that can be measured by the system 2.

The pencil 4 is a conventional pencil that can be freely bought in the market. The external diameter of the body of the pencil 4 is therefore generally between 1.5 mm and 3 cm. Here, it is chosen from the group consisting of a ball-point pen, an ink pen, a fountain pen, a felt-tip pen, a wooden pencil, a marker, a highlighter, a quill, a feather, a brush. In this embodiment, by way of illustration, the pencil 4 is a ball-point pen.

The pencil 4 has a tip or point 8 which deposits a colored liquid or solid onto a top face 10 of the writing medium 6. To this end, for example, the pencil 4 is provided with a tank of colored liquid such as a cartridge. The colored liquid can be ink. The point 8 is situated on the axis 7 at the bottom end of the pencil 4. In this embodiment, the point 8 exhibits a symmetry of revolution about the axis 7. Thus, the angular position of the point 8 about the axis 7 does not modify the width or the form of the trace left by this point 8 on the medium 6.

For example, the medium 6 is a conventional writing medium having a non-zero thickness e in the direction Z. Here, the thickness e is assumed constant over the entire face 10. The thickness e can be any thickness. In particular, this thickness e can be very small, that is to say less than 1 mm or than 0.5 mm in the case of a sheet of paper or a canvas. The thickness e can also be very great, that is to say greater than 5 mm in the case of a book or a notepad.

The medium 6 can be rigid or flexible. For example, a rigid medium is a magnetically insensitive sheet of glass or of metal. A flexible medium is a sheet of paper.

The surface of the face 10 is big enough to make it possible to write or draw. To this end, it is typically greater than 6 or 20 or 100 cm².

The medium 6 also has a bottom face 12 on the side opposite the face 10.

The system 2 comprises a magnetic ring 14 and an apparatus 16 for locating the point 8 in the XYZ reference frame from the measured position and orientation of the ring 14. In FIG. 1, the vertical curved lines indicate that a part of the apparatus 16 has not been represented.

The ring 14 is fixed onto the outer periphery of the body of the pencil 4. Typically, it surrounds the rigid body made of non-magnetic material of the pencil 4. The ring 14 is described in more detail with reference to FIG. 3.

The shortest distance which separates the point 8 from the orthogonal projection of the center of gravity of the ring 14 on the axis 7 is here denoted "a".

The apparatus 16 comprises a tablet 20 having a front bearing face 22 and a rear face 24. This tablet typically has no electrical or electronic circuitry. It is, for example, made from a single block of material.

The face 22 extends horizontally. The bottom face 12 of the medium 6 is directly placed on the face 22. The surface of the face 22 is big enough to make it possible to write or draw. Typically, it is greater than 20 or 100 cm².

The tablet 20 is produced from a non-magnetic material. For example, the Young's modulus of the tablet 20 is greater than 2 or 10 or 50 GPa at 25° C. Furthermore, its thickness is sufficient for it not to bend under the pressure exerted by the hand of the user when the latter writes using the pencil 4 on the medium 6. For example, the tablet 20 is a sheet of glass whose thickness is greater than 1 mm or 4 mm.

The apparatus 16 comprises a network of N tri-axial magnetometers $M_{ij}$. This network makes it possible to locate the ring 14 in the XYZ reference frame. Locating should be understood here to mean determining the x, y, z position of the ring 14 in the XYZ reference frame and also determining the orientation of the ring 14 relative to the directions X, Y and Z of the XYZ reference frame. For example, the orientation of the ring 14 is represented by the angles $\theta_x$, $\theta_y$ and $\theta_z$ of the magnetic moment of the ring 14, respectively, relative to the axes X, Y and Z of the reference frame.

Typically, N is greater than five and, preferably, greater than sixteen or thirty two. Here, N is greater than or equal to sixty four.

In this embodiment, the magnetometers $M_{ij}$ are aligned in rows and in columns to form a matrix. Here, this matrix comprises eight rows and eight columns. The indices i and j respectively identify the row and the column of this matrix where the magnetometer $M_{ij}$ is located. In FIG. 1, only the magnetometers $M_{i1}$, $M_{i2}$, $M_{i3}$, $M_{i4}$ and $M_{i8}$ of a row i are visible. The position of the magnetometers $M_{ij}$ relative to one another is described in more detail with reference to FIG. 2.

Each magnetometer $M_{ij}$ is fixed with no degree of freedom to the other magnetometers. To this end, the magnetometers $M_{ij}$ are fixed with no degree of freedom onto the rear face 24 of the tablet 20.

Each magnetometer $M_{ij}$ measures the direction and the intensity of the magnetic field generated by the ring 14. For this, each magnetometer $M_{ij}$ measures the norm of the orthogonal projection of the magnetic field generated by the ring 14 at the level of this magnetometer $M_{ij}$ on three measurement axes of this magnetometer. Here, these three measurement axes are mutually orthogonal. For example, the measurement axes of each of the magnetometers $M_{ij}$ are, respectively, parallel to the directions X, Y and Z of the reference frame. The sensitivity of the magnetometer $M_{ij}$ is for example less than $10^{-6}$T or $10^{-7}$T.

Each magnetometer $M_{ij}$ is connected via an information transmission bus 28 to a processing unit 30.

The processing unit 30 is capable of determining the position of the point 8 on the medium 6 from the position and orientation of the ring 14 measured in the XYZ reference frame by the magnetometers To $M_{ij}$. To this end, the unit 30 comprises a programmable electronic computer 32 suitable for executing instructions stored on an information storage medium. The unit 30 therefore also comprises a memory 34 containing the instructions necessary for the execution by the computer 32 of the method of FIG. 5. In particular, the unit 30 implements a mathematical model associating each measurement of a magnetometer $M_{ij}$ with the position and the orientation of the ring 14 in the XYZ reference frame. This model is implemented in the form of an extended Kalman filter. This model is typically constructed from the physical equations of electromagnetism. To construct this model, the ring 14 is approximated by a magnetic dipole. This approximation introduces only very few errors if the distance between the ring 14 and the magnetometer $M_{ij}$ is greater than 2 L and, preferably, greater than 3 L, where L is the greatest dimension of the ring 14. Typically, L is less than 7 cm and, preferably, less than 4 or 2 cm.

The unit 30 is also capable of acquiring and storing the trace left by the point 8 on the medium 6 from the different positions determined for this point.

Figure 2:
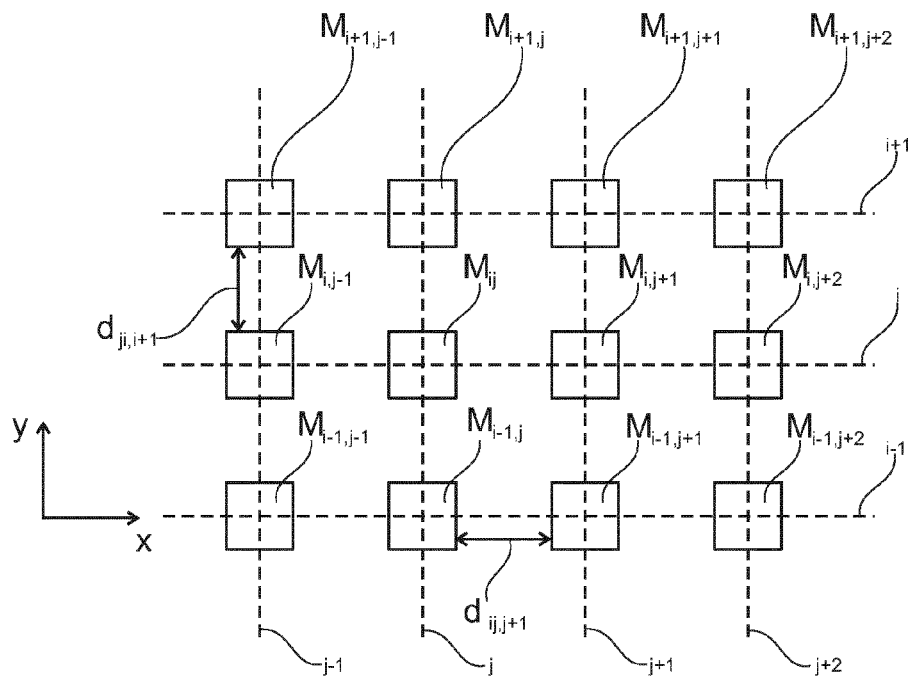
FIG. 2 is a schematic illustration of a network of magnetometers used in the system of FIG. 1.

FIG. 2 represents some of the magnetometers $M_{ij}$ of the apparatus 16. These magnetometers $M_{ij}$ are aligned in rows i parallel to the direction X. These magnetometers are also aligned in columns j parallel to the direction Y to form a matrix. The rows i and the columns j are arranged in ascending index order.

The center of the magnetometer $M_{ij}$ is located at the intersection of the row i and the column j. The center of the magnetometer corresponds to the point where the magnetic field is measured by this magnetometer. Here, the indices i and j lie within the interval [1; 8].

The center of two immediately consecutive magnetometers $M_{ij}$ and $M_{i,j+1}$ along a row i are separated by a distance $d_{i,j,j+i}$. Similarly, the center of two immediately consecutive magnetometers $M_{ij}$ and $M_{i+1,j}$ along one and the same column j are separated by a distance $d_{j,i,i+1}$.

Here, whatever the row i, the distance $d_{j,i,i+1}$ is the same. This distance is therefore denoted $d_j$. Similarly, whatever the column j, the distance $d_{j,i,i+1}$ between two magnetometers is the same. This distance is therefore denoted $d_i$.

In this particular embodiment, the distances $d_i$ and $d_j$ are both equal to d.

Typically, the distance d lies between 1 and 4 cm when:
the power of the permanent magnet is 0.5 A.m$^2$,
the sensitivity of the magnetometers is $4*10^{-7}$T, and
the number of magnetometers $M_{ij}$ is sixty four.

FIG. 3 represents the ring 14 in more detail. The ring 14 exhibits an overall magnetic moment parallel to the axis 7. In this embodiment, the magnetic moment of the ring 14 is merged with or coaxial to the axis 7. This ring 14 has a cylindrical outer face 38 of circular cross section. The generatrix of this cylindrical outer face is merged with the axis 7. The ends of the ring 14 terminate in end planes 40, 41 each at right angles to the axis 7. The length L of the ring 14 is therefore, in this embodiment, the shortest distance between the planes 40 and 41. This length L is preferably greater than the internal diameter $\Phi_{int}$ of the ring 14 and, preferably, two times greater than $\Phi_{int}$. Preferably, the length L of this ring is less than 15 cm, or less than 10 cm, even than 7 cm or 5 cm.

FIG. 4 represents the cross section of the ring 14. This ring 14 comprises an outer layer 44 of magnetic material and an inner layer 46 of elastic material. The layers 44 and 46 extend over the entire length L of the ring 14.

The layer 44 is solely produced by a magnetic material uniformly distributed about the axis 7. This magnetic material forms a permanent annular magnet of which the direction of the magnetic moment is merged with the axis 7. The outer face of the layer 44 corresponds to the outer face 38. This layer 44 also comprises an inner face 48 turned toward the axis 7. The thickness $e_{44}$ of the layer 44 is defined as being the shortest distance between the faces 38 and 48. For example, the thickness $e_{44}$ is greater than 0.5 or 1 mm and, generally, less than 1 cm or 5 mm. Here, the thickness $e_{44}$ is constant.

The magnetic material which makes up this layer 44 is a ferromagnetic or ferrimagnetic material. This material exhibits a non-zero magnetic moment even in the absence of any external magnetic field. For example, this material exhibits a coercive magnetic field greater than 100 A.m$^{-1}$ or 500 A.m$^{-1}$. The power of this permanent magnet is typically greater than 0.01 A.m$^2$ or 0.1 A.m$^2$.

To this end, the layer 44 is made of a rigid magnetic material. Here, "rigid" is understood to mean a material whose Young's modulus at 25° C. is greater than 15 or 30 or 50 GPa. In these conditions, the layer 44 cannot be adapted to different pencil diameters.

In this embodiment, to remedy this drawback, the layer 46 covers the inner face 48. This layer 46 has a cylindrical inner face 50 whose generatrix is merged with the axis 7. This face 50 is intended to come to bear directly on the body of the pencil 4. The cross section of the face 50 is circular. This layer 46 is elastically deformable upon the introduction of the pencil 4 into the ring 14 between a rest position, represented by solid lines in FIG. 4, and a deformed position, represented by broken lines in FIG. 4. The rest position corresponds to a value of the internal diameter $\Phi_{int}$ of between 1.5 mm and 3 cm and, preferably, between 5 mm and 1.5 cm. The deformed position corresponds to a greater value of the internal diameter $\Phi_{int}$ equal to the external diameter of the body of the pencil 4. The difference between these two values, denoted $\Delta\Phi$, is typically greater than 1 mm or 2 mm.

For this, the layer 46 is uniformly produced in an elastic material whose Young's modulus at 25° C. is less than or equal to 1 GPa and, preferably, less than or equal to 0.1 or 0.01 GPa. For example, the elastic material is an elastomer material or latex or a material with shape memory.

The thickness of the layer 46 in the radial direction is strictly greater than $\Delta\Phi$. For example, this thickness is greater than 2 or 4 mm.

Figure 5:
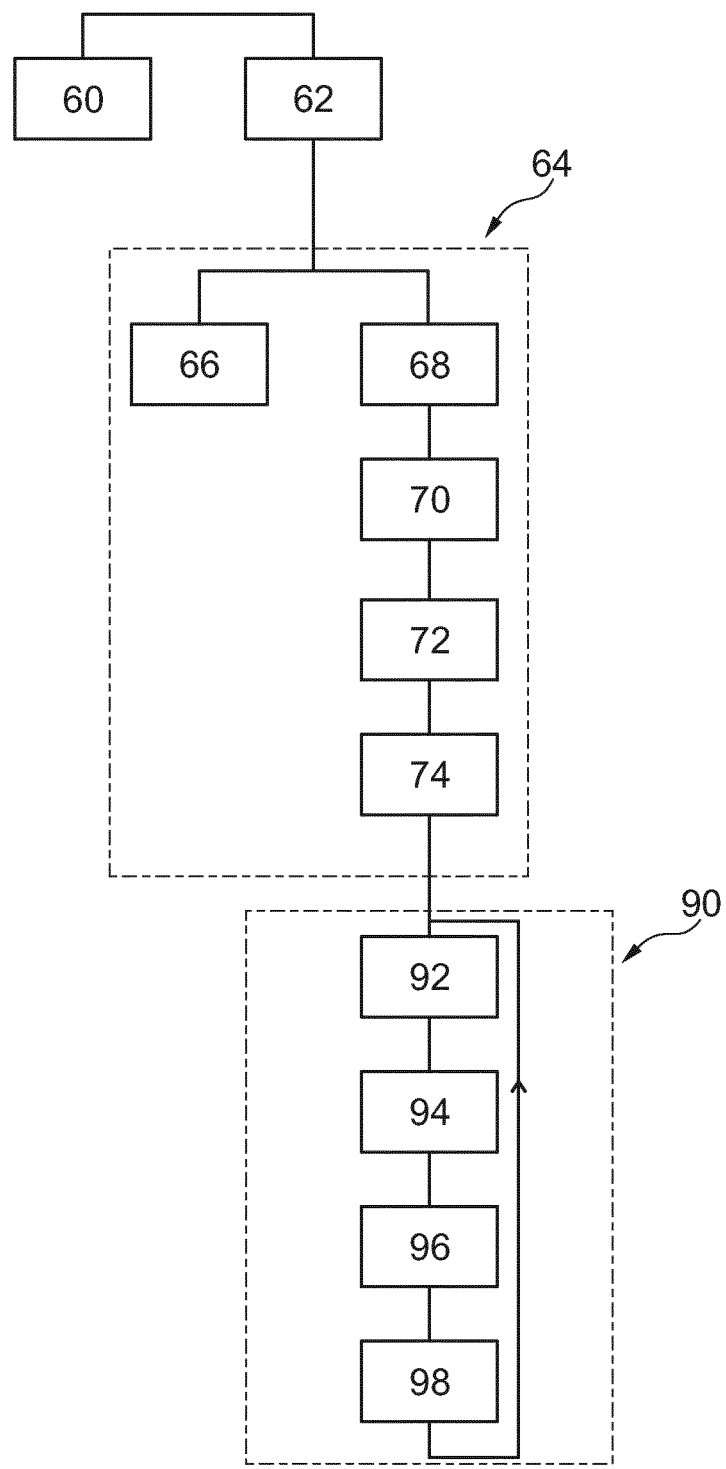
FIG. 5 is a flow diagram of a method for plotting the trace of a pencil using the system of FIG. 1.

The operation of the system 2 will now be described with reference to the method of FIG. 5.

In a step 60, the apparatus 16 permanently measures the position and the orientation of the ring 14 in the XYZ reference frame linked with no degree of freedom to the front face 22. To simplify, it is assumed here that the directions X and Y of this reference frame are contained in the plane of the front face 22. Consequently, the height, denoted $h_0$, of the ring 14 relative to the face 22, is equal to the value of the coordinate z of the ring 14 in the XYZ reference frame.

In parallel, in a step 62, the user fixes the ring 14 onto the pencil 4. For example, for this, he or she introduces the point 8 at the center of the ring 14 then slides the pencil 4 inside the ring 14. Under the effect of this action, the pencil 4 squeezes the elastic layer 46 and pushes it back to its deformed position. This increases the internal diameter of the ring 14 without deforming the magnetic material. Once the ring 14 has been positioned on the end of the body of the pencil 4 closest to the point 8, the elastic layer exerts a return force on the body of the pencil 4 which keeps the ring 14 in place as long as the pencil 4 is used.

After having positioned the ring 14 on the pencil 4, the user initiates a calibration phase 64.

Figure 12:
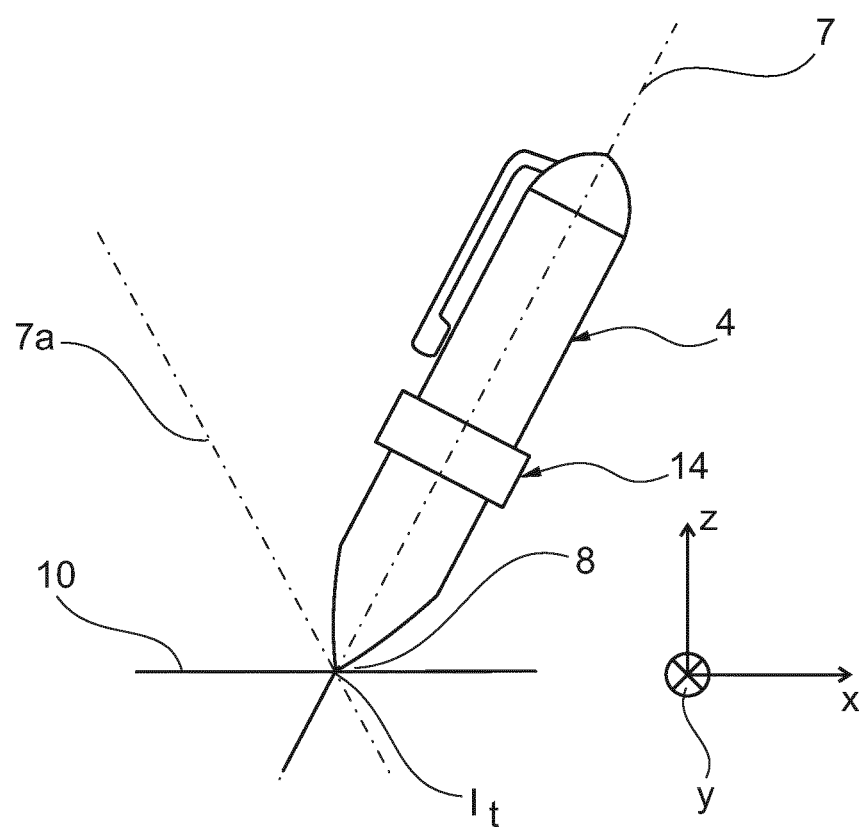
FIG. 12 is a schematic illustration of different calibration positions of the system of FIG. 1 with a pencil.

At the start of this phase, in a step 66, the user keeps the point 8 of the pencil 4 in contact with the face 10 then moves the opposite end of the pencil 4 to modify its inclination relative to the medium 6 without modifying the position of the point 8 on this medium 6. FIG. 12 represents two positions of the pen 4 obtained in the step 66. In this figure, the axis 7 corresponds to a first inclination whereas the axis 7a corresponds to a second inclination of the pen 4. To simplify FIG. 12, only the axis 7a has been represented for the second inclination.

In parallel, in a step 68, the computer 32 plots the position and the orientation of the ring 14 measured by the network of magnetometers. Thus, the computer 14 plots a series of orientations which all point to the point of contact between the point 8 and the face 10 of the medium 6. In FIG. 12, this point of contact bears the reference $I_t$.

Hereinafter in this description, the computation of the value of a threshold $S_{cp}$ of contact and of the distance "a" is illustrated in the case of the first and second inclinations represented in FIG. 12. However, what is described below can easily be generalized as necessary to more than two inclinations of the pencil 4.

The threshold $S_{cp}$ makes it possible to detect the contact of the point 8 with the medium 6. In effect, it is considered that there is a point of contact between the point 8 and the medium 6 if the height $h_p$ of the point 8 relative to the face 22 is less than or equal to the threshold $S_{cp}$. This threshold $S_{cp}$ is a function of the thickness e of the medium 6.

In a step 70, the unit 30 computes the point of intersection $I_t$ between the axes 7 and 7a. Preferably, for this, the unit 30 computes the coordinates of the point of the XYZ reference frame which minimize the difference between the axes 7 and 7a. The height of the point of intersection $I_t$ relative to the face 22 makes it possible to obtain an estimation of the thickness e of the medium 6.

Then, in a step 72, the value of the threshold $S_{cp}$ is computed from this estimation of the thickness e. For example, the value of the threshold $S_{cp}$ is chosen to be equal to this estimation plus an error margin E. The error margin E is determined by trial and error. For example, E is chosen here to be less than or equal to 1 mm or 0.5 mm or 0.1 mm or 0.05 mm or 0.0025 mm.

Finally, in a step 74, the distance "a" is computed. For example, the unit 30 computes the distance "a" as a function of the position and of the orientation plotted in the step 68. In effect, since the point 8 is in contact with the face 10, the distance "a" corresponds to the distance which separates the ring 14 from the face 10 in the direction of its magnetic moment. For example, the distance "a" is computed using the following relationship: $h_0=a*\cos\theta+e$, in which:

$h_0$ is the height of the ring 14 relative to the face 22;

$\theta$ is the angle between the magnetic moment of the ring 14 and the vertical direction Z, and "e" is the estimation of the thickness of the medium 6 obtained in the step 70.

The angle $\theta$ and the value of height $h_0$ are deduced from the plots performed in the step 68. Once the distance "a" is computed, it is said that it is "known". It is stored in the memory 34.

Once the threshold $S_{cp}$ and the distance "a" have been configured, the unit 30 proceeds to a phase 90 of plotting the trace left by the pencil 4 on the face 10 of the medium 6.

For this, in a step 92, the unit 30 computes the position of the point 8 in the XYZ reference frame from the position and the orientation of the ring 14 measured in the step 60 and from the known distance "a". Furthermore, the position of the point at the moment when it is in contact with the face 10 is equal to the position of the point of contact. For example, the position of the point 8 is equal to the position of the ring 14 offset by the distance "a" in the direction of the magnetic moment of the ring 14. Thus, the height $h_p$ is computed using the following relationship: $h_p=h_0-a*\cos\theta$, in which $\theta$ is the angle between the magnetic moment of the ring 14 and the vertical direction Z. The angle $\theta$ and the value of the height $h_0$ are measured in the step 60. The coordinates of the position of the point 8 in the XYZ reference frame are here denoted $x_p$, $y_p$ and $z_p$. Here, the coordinate $z_p$ is equal to the height $h_p$.

In a step 94, the unit 30 detects the point of contact between the point 8 and the face 10. For this, the unit 30 compares the height $h_p$ to the threshold $S_{cp}$. A point of contact is detected only when the height $h_p$ is less than the threshold $S_{cp}$.

Then, each time a point of contact is detected, in a step 96, the unit 30 plots the coordinates $x_p$ and $y_p$ at the moment when this point of contact occurs.

In a step 98, the unit 30 stores, for example in the memory 34, the position computed for the point 8 when the latter is in contact with the medium 6.

The steps 92 and 98 are reiterated in a loop.

The successive storage of the position of the point 8 on the face 10 constitutes the plot of the trace left by the point 8 on the medium 6. For example, here, each position of the point 8 when it is in contact with the medium 6 is stored in chronological order. Conversely, the positions of the point 8 when the latter is not in contact with the medium 6 are stored as not forming part of the trace left on the medium 6.

FIGS. 6 and 7 represent a ring 110 that can be used in the system 2 instead of the ring 14. This ring 110 is identical to the ring 14 except that the layer 44 is replaced by a magnetic layer 112. This layer 112 is identical to the layer 44, except that the magnetic material is not continuously distributed about the axis 7. Here, the layer 112 comprises N blocks 114 of mechanically rigid magnetic materials separated from one another by segments 116 of elastic material, in which N is an integer number strictly greater than two. To simplify FIGS. 6 and 7, N is taken to be equal to two. In this embodiment, the blocks 114 are all identical to one another and uniformly distributed over the periphery of the layer 46.

For example, the magnetic material of the blocks 114 is the same as that used to produce the layer 44. The elastic material used to produce the segments 116 is, for example, the same as that used for the layer 46.

Furthermore, in this embodiment, the layer 112 is covered with a layer 120 of elastic material. The material of the layer 120 is, for example, identical to that of the layer 46.

FIG. 6 represents the elastic material of the segments 116 and of the layers 46 and 120 in its rest position, and FIG. 7 represents this same elastic material in its deformed position.

When the ring 110 is inserted onto the pencil 4, the segments 116 stretch so as to allow the different blocks 114 to be separated from one another. This makes it possible to fix the ring 110 on pencils of different diameters without deforming the blocks 114 of magnetic material.

FIGS. 8 and 9 represent a ring 130 that can be used in the system 2. More specifically, the ring 130 is identical to the ring 110, except that the layers 44 and 120 are omitted and the ring 130 can be moved, reversibly, directly by the hand of the user, between an open position represented in FIG. 8 and a closed position represented in FIG. 9. In FIGS. 8 and 9, the number N of blocks 114 is taken to be equal to seven.

In the open position, the ring 130 forms a band 132 extending essentially in a plane X'Y' in which X' and Y' are orthogonal directions, the direction Y' being parallel to the axis 7. In the closed position, the band 132 is wound on the periphery of the body of the pencil 4 to form a closed magnetic ring.

The band 132 has two opposite ends, 134 and 136, in the direction X'. In the open position, these ends are separated from one another by a distance strictly greater than the external diameter of the body of the pencil 4. In the closed position, these ends 134, 136 are superposed one on top of the other.

Here, the ends 134 and 136 are equipped with a locking mechanism suitable for locking the ring 130 in its closed position and, alternatively, for allowing the ring 130 to be displaced to its open position. For example, this locking mechanism consists of respective parts of self-gripping strips each fixed onto the ends 134 and 136. This self-gripping strip is also better known by the name VELCRO® or "Velcro Strip®".

Depending on the diameter of the pencil 4, the segments 116 stretch, which makes it possible to elongate the band 132 when it is wound around the body of the pencil 4 in such a way that the ends 134 and 136 meet in the closed position.

FIG. 10 represents an accessory 150 for the pencil 4. This accessory 150 comprises a magnetic ring 152 and two rigid shells 154 and 156. The shells 154 and 156 are intended to keep the direction of the magnetic moment of the ring 152 parallel to the axis 7.

Here, the ring 152 is, for example, identical to the ring 14, except that its length L is less than the value of its diameter $\Phi_{int}$ in its rest position.

The shell 154 comprises a housing 160 suitable for pinching, with no degree of freedom, a portion of the ring 152. To make this housing more visible, in FIG. 10, a gap is represented between this housing 160 and the ring 152. In reality, this gap does not exist or is strictly less than 100 or 10 or 5 µm.

The ends of the shell 154, opposite in the direction parallel to the axis 7, are each equipped with a first part, respectively 162, 164, of jaws 166, 168.

For example, the shells 154 and 156 are symmetrical to one another relative to a plane of symmetry containing the axis 7. Thus, the shell 156 is deduced by symmetry of the shell 154. However, in the shell 156, the numerical references 162 and 164 have been replaced by numerical references 170 and 172.

The shell 156 is mechanically connected to the shell 154 by a hinge 174, the axis of rotation of which is parallel to the axis 7.

The jaws 166 and 168 are separated from one another in a direction parallel to the axis 7 by a distance $L_c$ strictly greater than the value of the diameter $\Phi_{int}$ in the rest position and, preferably, two or three times greater than that value. The distance $L_c$ is, for example, equal to the length L of the ring 14.

The jaw 166 can be displaced between an open position, represented in FIG. 11 by solid lines, and a closed position represented in FIG. 11 by dotted lines.

In the closed position, the jaw 166 grips the body of the pencil 4. In the open position, the jaw 166 releases the body of the pencil 4 so that the pencil 4 can be removed from the jaws 166 and 168. The jaw 166 passes, reversibly, between the closed position and the open position by pivoting about the axis of the hinge 174.

For example, the jaw 168 is identical to the jaw 166, except that it is situated on the opposite side of the shell.

The shells are also equipped with a means for locking the jaws 166 and 168 in their closed position.

The shells 154 and 156 therefore make it possible to stabilize the ring 152 in a position in which the direction of its magnetic moment is merged with the axis 7 when the jaws 166 and 168 are in their closed position.

Preferably, the outer face of the shells 154 and 156 covers the ring 152 and forms a means for gripping the pencil 4 while a user writes with this pencil 4.

Numerous other embodiments are possible. For example, the magnetic material is not a permanent magnet but is produced in a paramagnetic, diamagnetic material or a soft ferromagnetic material.

The section of the ring is not necessarily a circular section. In this case, "internal diameter" denotes the internal hydraulic diameter. In fact, the cross section of the ring can be anything provided that the latter has a center in a plane at right angles to the axis 7 situated on the longitudinal axis. For example, the cross section of the inner face can also be square, oval or rectangular.

As a variant, the overall magnetic moment of the ring is parallel to the axis 7 but is not merged with this axis. For example, the quantity of magnetic material is not uniformly distributed about the axis 7. For example, the blocks 114 situated on one side of a plane containing the axis 7 exhibits stronger magnetic moments than those situated on the other side of this same plane. In another variant, the distribution of the magnetic material in the layer 44 is modified in such a way as to obtain a ring that has a magnetic moment parallel with the axis 7 but not merged with this axis.

The thickness of the layer 46 is not necessarily constant along the periphery of the face 48. For example, the inner face 50 has hollows and bosses more than 0.5 mm high in the rest position to increase the coefficient of friction between the pencil 4 and the ring 14.

Other embodiments of the mechanism for locking the ring 130 are possible. For example, the self-gripping strips can be replaced by glues exhibiting a weak adherence such as those used to produce adhesive slips better known by the term "post-it".

The ring is not necessarily closed. For example, the ring 14 is sawn on just one of its sides parallel to the axis 7.

Everything described previously in the particular case of a pencil applies also to the case of an eraser.

The accessory 150 can be used with magnetic rings without any material that is elastically deformable between:
a rest position corresponding to a first value of the internal diameter of the ring, and
a deformed position corresponding to a second value of the internal diameter of the ring, the difference between the first and second values of the internal diameter being greater than or equal to 1 mm.

The invention claimed is:

1. A magnetic ring suitable for being fixed removably onto a pencil or an eraser, the smaller internal diameter of the ring being between 1.5 mm and 3 cm, the ring comprising:
   a cylindrical inner face centered on a longitudinal axis and an outer face opposite the inner face,
   a magnetic material distributed in a magnetic layer around the longitudinal axis in such a way that the direction of the overall magnetic moment of the magnetic ring is parallel to the longitudinal axis, wherein the ring includes an elastic material, distinct from the magnetic material, that is elastically deformable between:
a rest position corresponding to a first value of the internal diameter of the ring, and
a deformed position corresponding to a second value of the internal diameter of the ring, the difference between the first and second values of the internal diameter being greater than or equal to 1 mm, this elastic material exhibiting a Young's modulus at 25° C. less than or equal to 1 GPa.

2. The magnetic ring as claimed in claim 1, in which:
inside the magnetic layer, the magnetic material extends continually around the longitudinal axis over an angular segment, at right angles to the longitudinal axis and a vertex of which is situated on the longitudinal axis, strictly greater than 180° or 220°, and the elastic material is distributed between the magnetic layer and the inner face of the ring so as to form an elastic layer whose thickness, in a direction at right angles to the longitudinal axis, is greater than 1 mm.

3. The magnetic ring as claimed in claim 1, in which, inside the magnetic layer, the magnetic material is distributed in a plurality of blocks separate from one another and the elastic material is housed between these blocks.

4. The magnetic ring as claimed in claim 1, in which the ring comprises two ends and the ring can be deformed, reversibly by a human being, between:
an open position in which the two ends are spaced apart from one another by a distance greater than the first value of the internal diameter of the ring so as to open the ring, and
a closed position in which the two ends are mechanically coupled to one another to close the ring.

5. The magnetic ring as claimed in claim 4, in which the ring includes a locking mechanism suitable for being displaced between:
a locked position in which this mechanism keeps the ring in its closed position, and
an unlocked position in which the mechanism allows the displacement of the ring to its open position.

6. The magnetic ring as claimed in claim 5, in which the locking mechanism comprises a self-gripping strip.

7. The magnetic ring as claimed in claim 1, in which the length of the ring parallel to the longitudinal axis is at least greater than the greatest possible value of the internal diameter of this ring.

8. The magnetic ring as claimed in claim 1, in which the magnetic material exhibits a Young's modulus at 25° C. greater than 20 GPa.

9. An accessory for a pencil or an eraser, the accessory comprising:
a magnetic ring comprising a cylindrical inner face centered on a longitudinal axis, at least one rigid shell comprising a housing configured to receive the magnetic ring and keep the longitudinal axis of the magnetic ring received in this housing parallel to a longitudinal axis of the pencil or of the eraser when this shell is fixed with no degree of freedom onto this pencil or this eraser,
first and second jaws, each jaw comprising first and second parts that can be displaced between:
a closed position in which the first and second parts are suitable for gripping the pencil or the eraser to fix the shell onto this pencil or this eraser, and
an open position in which the first and second parts release the pencil or the eraser, the first and second jaws being fixed with no degree of freedom to said at least one shell and spaced apart from one another in a direction parallel to the longitudinal axis of the magnetic ring by a distance at least two times greater than the greatest possible value of the internal diameter of the magnetic ring, wherein the magnetic ring conforms to claim 1.

10. A system for plotting the trace of a pencil or an eraser on a writing medium comprising:
a magnetic ring suitable for being fixed removably onto the pencil or the eraser,
a bearing face of a tablet, the bearing face forming the writing medium or supporting the writing medium,
a network of magnetometers suitable for measuring the magnetic field generated by the magnetic ring, the network of magnetometers being fixed with no degree of freedom to the bearing face of the tablet,
a computer suitable for determining the position and the orientation of the magnetic ring in order to deduce therefrom the position of the point of the pencil or of the eraser relative to the bearing face from the measurements of the network of magnetometers, wherein the magnetic ring conforms to claim 1.

* * * * *